(12) United States Patent
Ishii

(10) Patent No.: US 10,534,418 B2
(45) Date of Patent: Jan. 14, 2020

(54) ELECTRONIC CIRCUIT, ARITHMETIC PROCESSING CONTROL METHOD, PROGRAM, AND MULTI-CORE PROCESSOR

(71) Applicant: NEC Corporation, Minato-ku, Tokyo (JP)

(72) Inventor: Yasuo Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 19 days.

(21) Appl. No.: 15/082,134

(22) Filed: Mar. 28, 2016

(65) Prior Publication Data
US 2016/0291669 A1   Oct. 6, 2016

(30) Foreign Application Priority Data

Mar. 30, 2015  (JP) .................. 2015-068826

(51) Int. Cl.
| | |
|---|---|
| G06F 1/32 | (2019.01) |
| G06F 1/3203 | (2019.01) |
| G06F 1/329 | (2019.01) |
| G06F 1/3234 | (2019.01) |
| G06F 9/38 | (2018.01) |

(52) U.S. Cl.
CPC ............ *G06F 1/3203* (2013.01); *G06F 1/329* (2013.01); *G06F 1/3243* (2013.01); *G06F 9/3836* (2013.01); *G06F 9/3869* (2013.01); *Y02D 10/152* (2018.01); *Y02D 10/24* (2018.01)

(58) Field of Classification Search
CPC ................ G06F 1/32; G06F 1/26; G06F 1/28
USPC ........ 713/300, 310, 321, 322, 323, 324, 340, 713/375
See application file for complete search history.

(56) References Cited

U.S. PATENT DOCUMENTS

| | | | | |
|---|---|---|---|---|
| 8,037,340 | B2* | 10/2011 | Kim ......................... | G06F 1/08 713/503 |
| 9,069,959 | B2* | 6/2015 | Nowottnick ............ | G06F 21/55 |
| 2003/0079150 | A1* | 4/2003 | Smith .................... | G06F 1/3203 713/320 |
| 2011/0111811 | A1* | 5/2011 | Juang, Jr. ................. | G06F 1/26 455/573 |
| 2011/0185203 | A1* | 7/2011 | Carlson .................... | G06F 1/32 713/320 |
| 2012/0026524 | A1* | 2/2012 | Sekido .................. | G03G 15/80 358/1.13 |

(Continued)

FOREIGN PATENT DOCUMENTS

| | | |
|---|---|---|
| JP | H10-283082 A | 10/1998 |
| JP | 2005-327210 A | 11/2005 |

(Continued)

OTHER PUBLICATIONS

Japanese Office Action for JP Application No. 2015-068826 dated Oct. 18, 2016 with English Translation.

(Continued)

*Primary Examiner* — Jaweed A Abbaszadeh
*Assistant Examiner* — Keshab R Pandey

(57) ABSTRACT

An electronic circuit includes: an arithmetic processing part executing given arithmetic processing; and a capacitor supplying accumulated electric charge when the arithmetic processing part executes arithmetic processing. The arithmetic processing part operates by using the electric charge supplied from the capacitor.

9 Claims, 9 Drawing Sheets

(56) References Cited

U.S. PATENT DOCUMENTS

2013/0268781 A1* 10/2013 Kanai ................. G06F 1/26
                                                                713/300
2015/0177811 A1*  6/2015 Bose ................. G06F 1/3287
                                                                 713/324

FOREIGN PATENT DOCUMENTS

| JP | 2007-011835 A | 1/2007 |
| JP | 2011-259625 A | 12/2011 |
| JP | 2013-518346 A | 5/2013 |
| WO | 2006/134914 A1 | 12/2006 |

OTHER PUBLICATIONS

Japanese Office Action for JP Application No. 2015-068826 dated May 17, 2016 with English Translation.

* cited by examiner

ELECTRONIC CIRCUIT, ARITHMETIC PROCESSING CONTROL METHOD, PROGRAM, AND MULTI-CORE PROCESSOR

INCORPORATION BY REFERENCE

This application is based upon and claims the benefit of priority from Japanese patent application No. 2015-068826, filed on Mar. 30, 2015, the disclosure of which is incorporated herein in its entirety by reference.

TECHNICAL FIELD

The present invention relates to an electronic circuit, an arithmetic processing control method, a program, and a multi-core processor.

BACKGROUND ART

It is known as the so-called dark silicon problem that all the transistors cannot be caused to operate simultaneously because of the balance with power consumption.

Due to the abovementioned problem, there is a case where an electronic circuit needs limitation of the operation thereof as necessary. In other words, because there is a fear that simultaneous operation of all the circuits results in excessive power consumption and malfunction, there is a case where it is required to limit the operation of the circuit as necessary and thereby prevent excessive power consumption.

As one of the techniques for preventing such an operation of the circuit, Patent Document 1 is known, for example. Patent Document 1 discloses a processor which includes a power accumulation part accumulating power information about power consumed during issuance of an instruction, a comparison part comparing the accumulated power information with a given threshold, and a control part blocking another instruction from being issued. According to Patent Document 1, in a case where the accumulated power information exceeds the threshold, the control part blocks another instruction from being issued.

Patent Document 1: Japanese Unexamined Patent Application Publication No. JP-A 2013-518346

However, according to the technique disclosed in Patent Document 1, issuance of an instruction is blocked when the accumulated power information exceeds the given threshold. Therefore, employing the technique disclosed in Patent Document 1 may restrict issuance of a new instruction without exception when, for example, power consumption becomes equal to or more than a predetermined rating.

Thus, there is a problem that issuance of a new instruction may be restricted without exception when power consumption exceeds a rating in an electronic circuit.

SUMMARY OF THE INVENTION

Accordingly, an object of the present invention is to provide an electronic circuit which solves the problem that issuance of a new instruction may be restricted without exception when power consumption exceeds a rating in an electronic circuit.

In order to achieve the object, an electronic circuit as an aspect of the present invention is an electronic circuit including:

an arithmetic processing part executing given arithmetic processing; and a capacitor supplying accumulated electric charge when the arithmetic processing part executes arithmetic processing, The arithmetic processing part operates by using the electric charge supplied from the capacitor.

Further, an arithmetic processing control method as another aspect of the present invention includes:

causing an accumulator to accumulate electric charge supplied from an external power supply device;

supplying the accumulated electric charge; and operating by using the supplied electric charge and thereby executing given arithmetic processing.

Further, a non-transitory computer-readable medium storing a program as another aspect of the present invention stores a program including instructions for causing an information processing device having a capacitor supplying accumulated electric charge when an arithmetic processing unit executes arithmetic processing to realize:

an arithmetic processing unit executing given arithmetic processing, wherein the arithmetic processing unit operates by using the electric charge supplied from the capacitor.

Further, a multi-core processor as another aspect of the present invention is a multi-core processor having a plurality of processor cores. Each of the processor cores includes:

an arithmetic processing part executing given arithmetic processing; and a capacitor supplying accumulated electric charge when the arithmetic processing part executes arithmetic processing, The arithmetic processing part operates by using the electric charge supplied from the capacitor.

With the configurations as described above, the present invention can provide an electronic circuit which solves the problem that issuance of a new instruction may be restricted without exception when power consumption exceeds a rating in an electronic circuit.

EXEMPLARY EMBODIMENT

First Exemplary Embodiment

Figure 1:
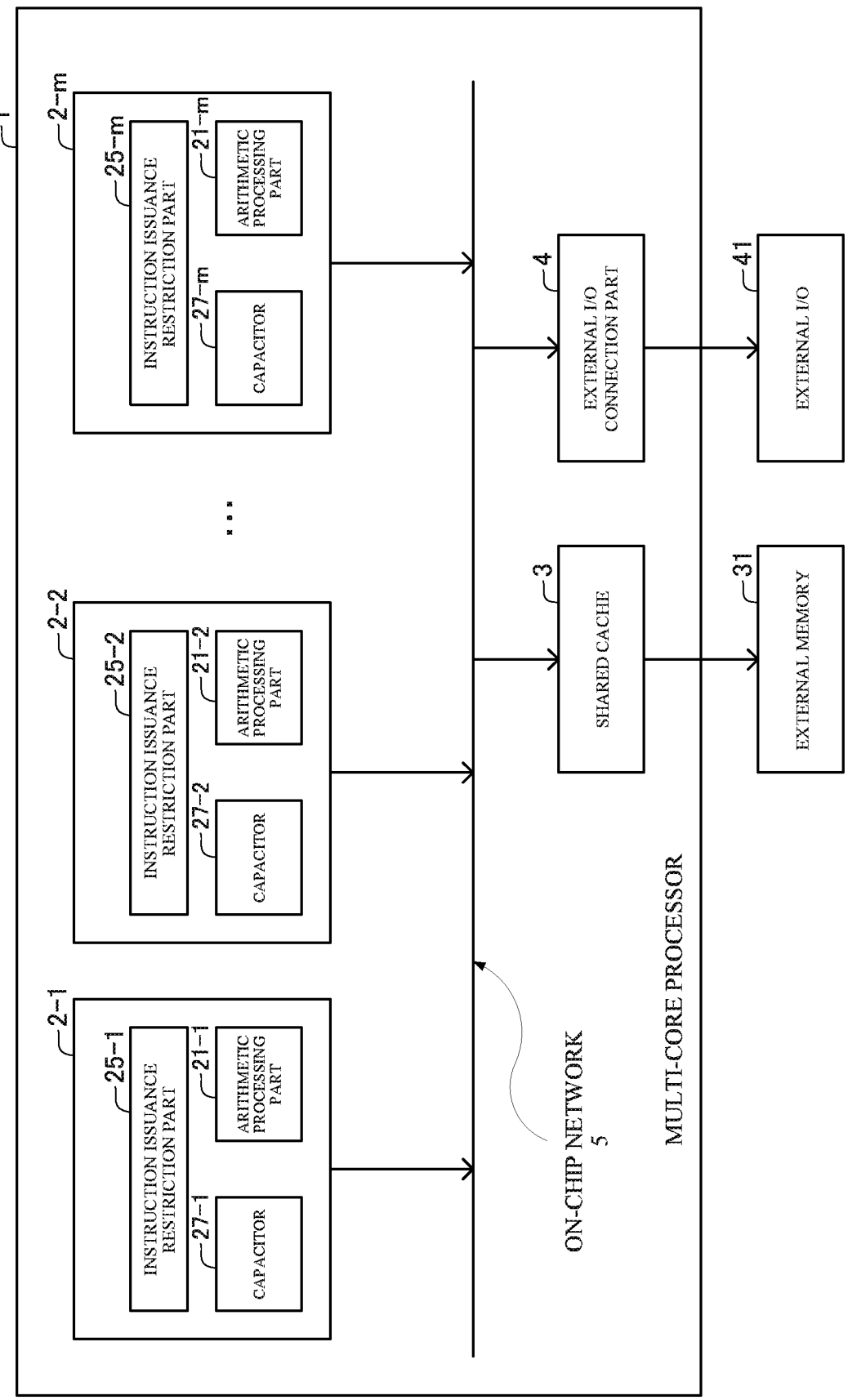
FIG. 1 a block diagram showing an example of the configuration of a multi-core processor according to a first exemplary embodiment of the present invention.
Figure 2:
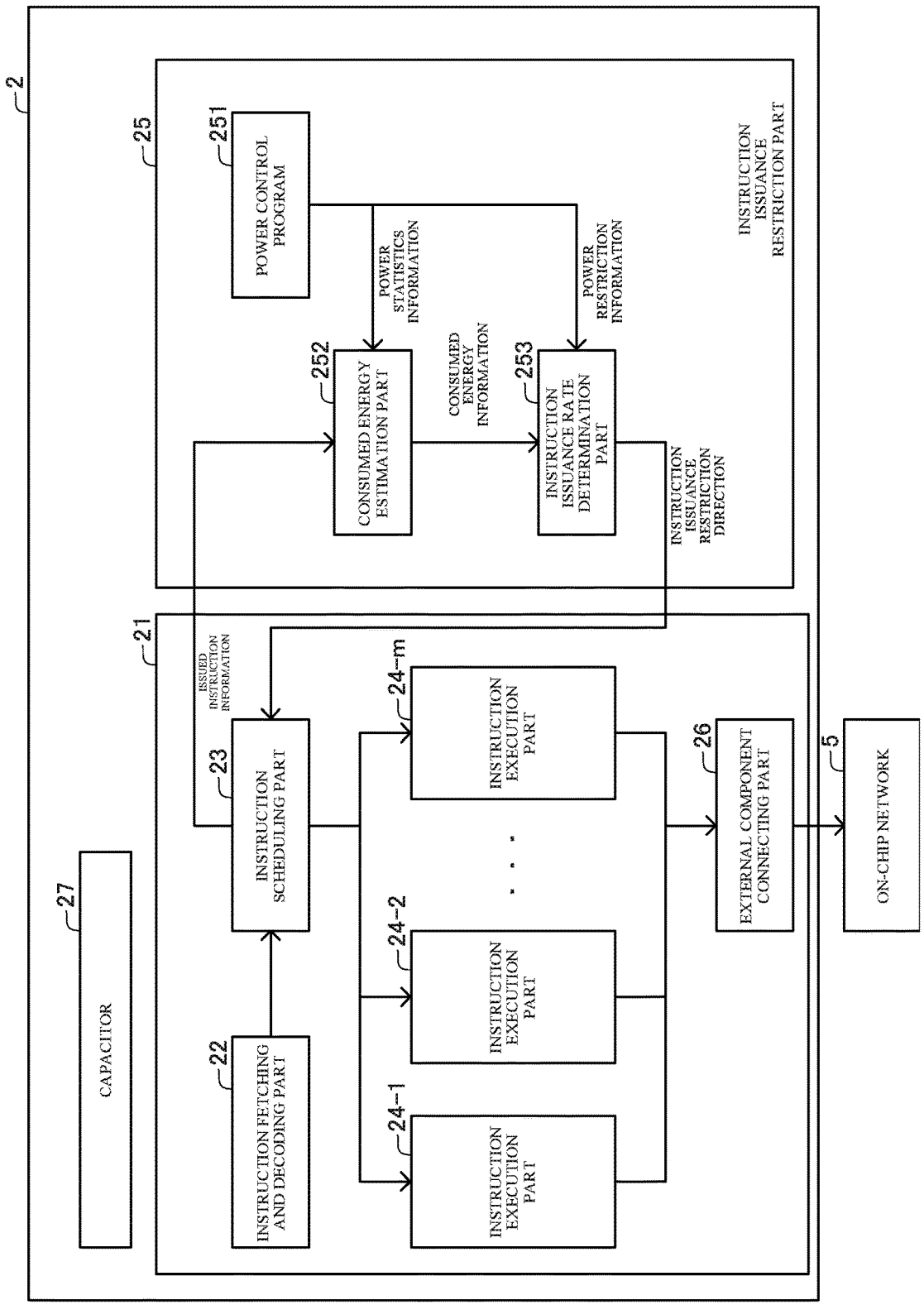
FIG. 2 is a block diagram showing an example of the configuration of a processor core according to the first exemplary embodiment of the present invention.
Figure 3:
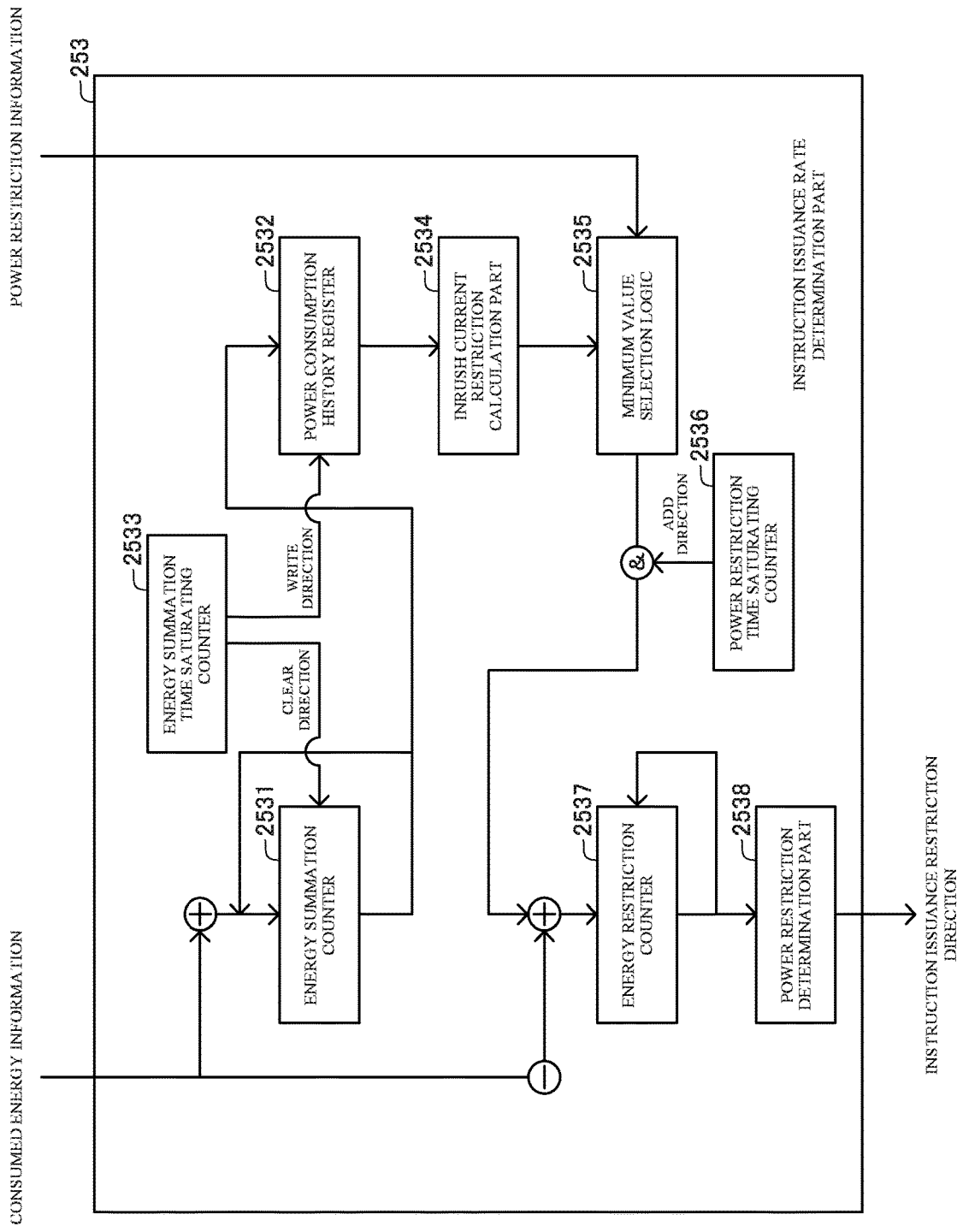
FIG. 3 is a block diagram showing an example of the configuration of an instruction issuance rate determination part according to the first exemplary embodiment of the present invention.
Figure 4:
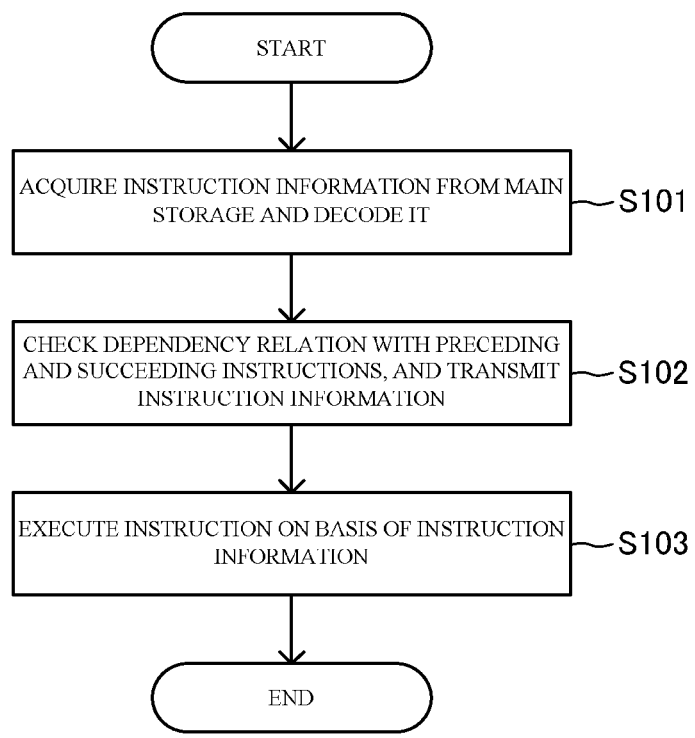
FIG. 4 is a flowchart showing an example of the operation of the processor core according to the first exemplary embodiment of the present invention.
Figure 5:
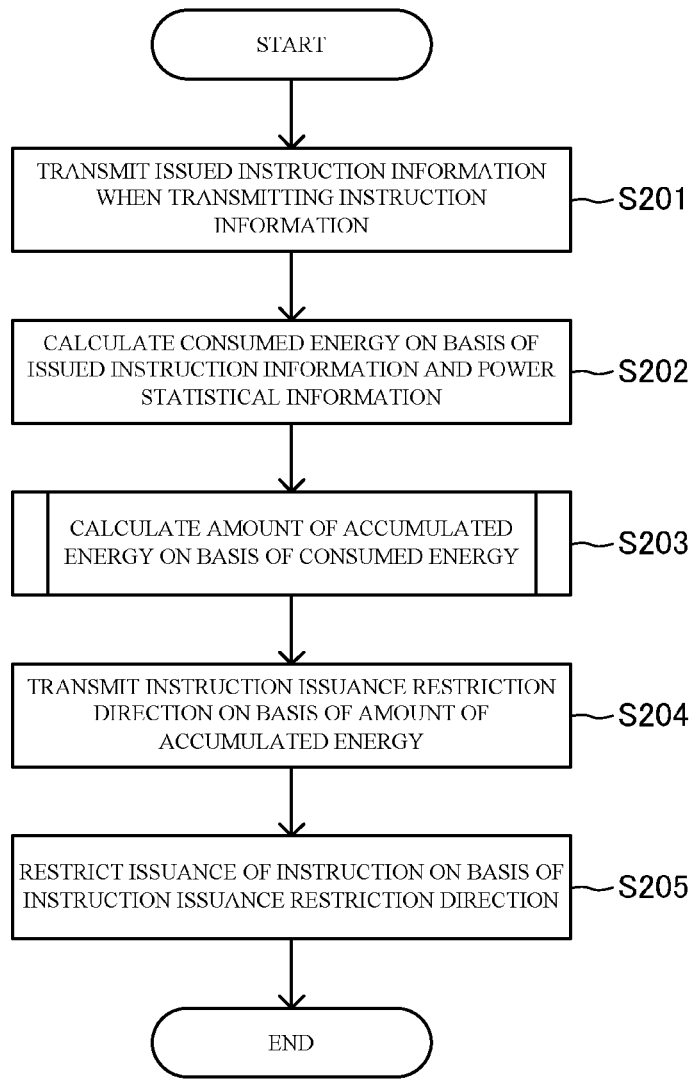
FIG. 5 is a flowchart showing an example of the operation of the processor core according to the first exemplary embodiment of the present invention.
Figure 6:
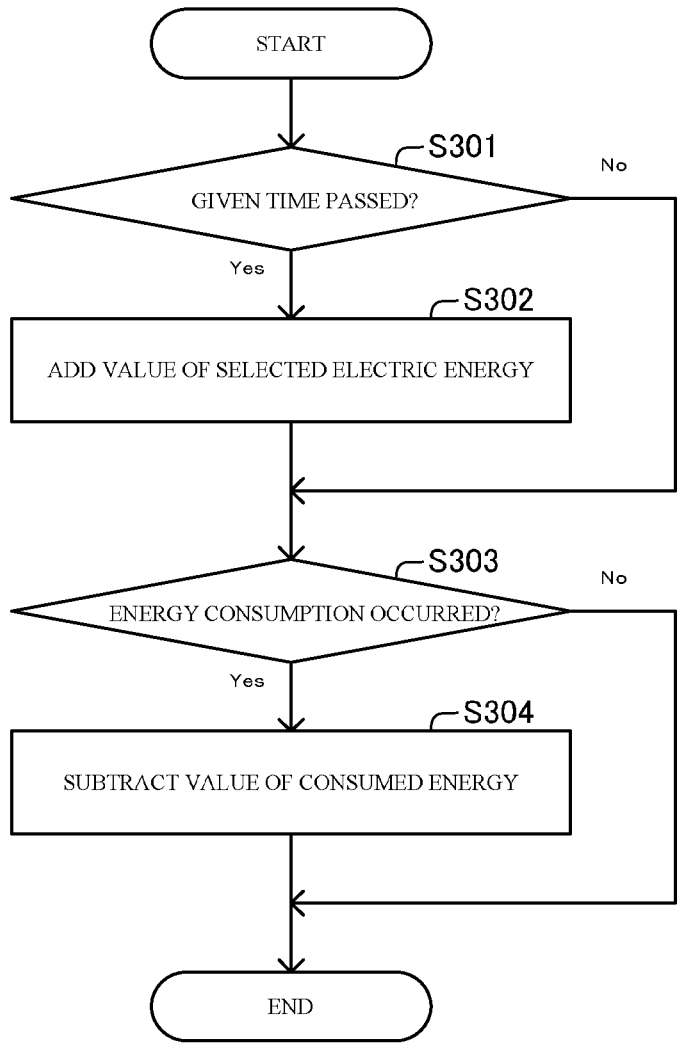
FIG. 6 is a flowchart showing an example of the operation of the instruction issuance rate determination part included by the processor core in calculating accumulated energy according to the first exemplary embodiment of the present invention.
Figure 7:
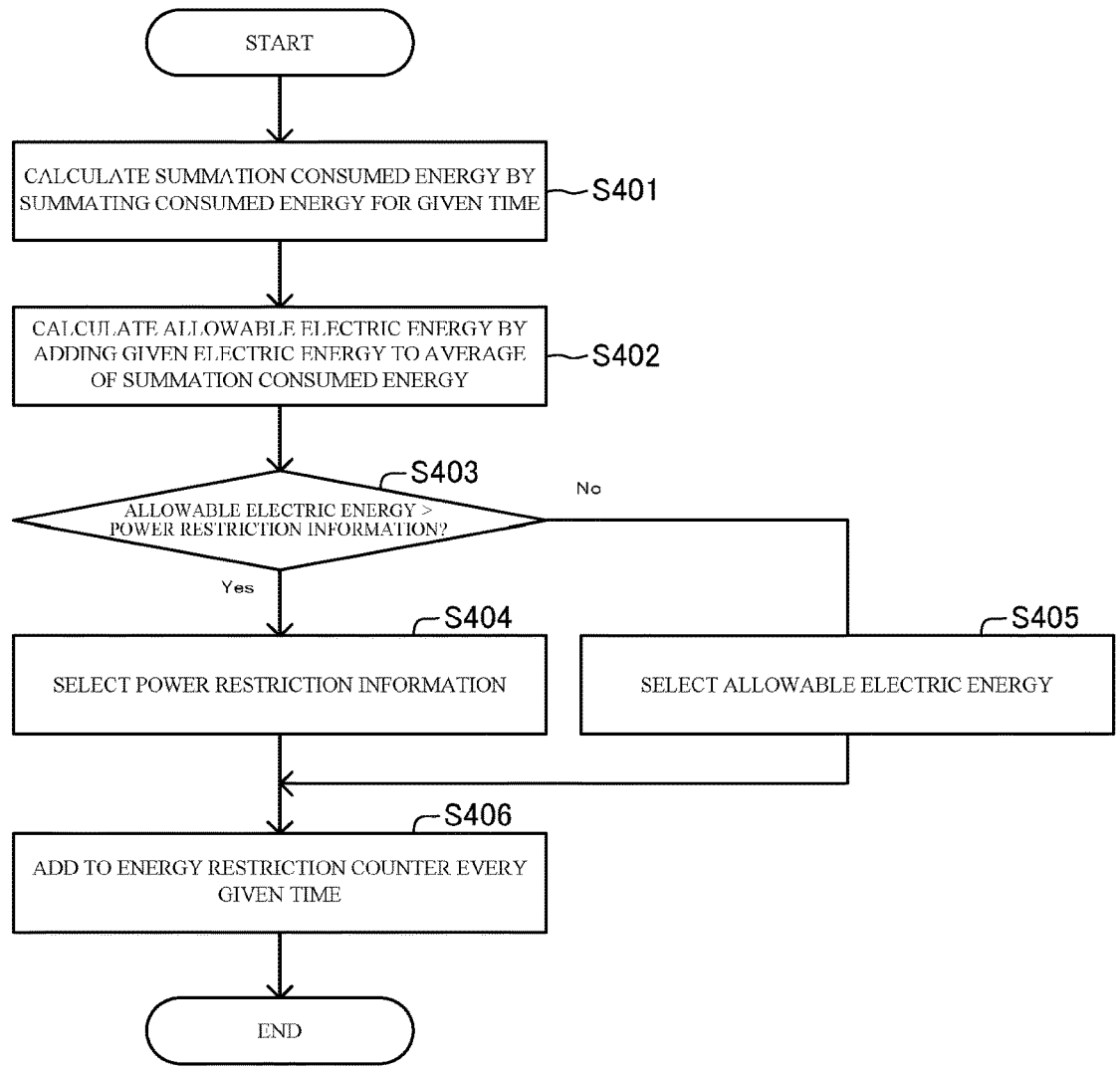
FIG. 7 is a flowchart showing an example of the operation performed from reception of consumed energy information by the instruction issuance rate determination part included by the processor core to selection of electric energy by a minimum value selection logic according to the first exemplary embodiment of the present invention.

A first exemplary embodiment of the present invention will be described referring to FIGS. 1 to 11. FIG. 1 is a block diagram showing an example of the configuration of a multi-core processor 1. FIG. 2 is a block diagram showing an example of the configuration of a processor core 2. FIG. 3 is a block diagram showing an example of the configuration of an instruction issuance rate determination part 253. FIGS. 4 and 5 are flowcharts showing examples of the operation of the processor core 2. FIG. 6 is a flowchart showing an example the operation of the instruction issuance rate determination part 253 in calculating the amount of accumulated energy. FIG. 7 is a flowchart showing an example of the operation performed from reception of consumed energy information by the instruction issuance rate determination part 253 to selection of electric energy by a minimum value selection logic 2535. FIGS. 8 to 11 are graphs showing examples of the relation between accumulated electric charge in a capacitor and consumed energy.

In the first exemplary embodiment of the present invention, the multi-core processor 1 (an electronic circuit) which can set the upper limit of power for each processor core 2 will be described. As described later, each processor core 2 in this exemplary embodiment calculates energy which is consumed in executing arithmetic processing appropriate for an instruction issued by an arithmetic processing part 21 on the basis of the instruction (consumed energy). Moreover, each processor core 2 calculates the amount of accumulated energy which is energy accumulated in a capacitor 27 on the basis of the calculated consumed energy and energy supplied to the processor core 2 (supplied energy). Each processor core 2 then limits issuance of a new instruction by the processor core 2 with consideration of the energy accumulated in the capacitor 27. Consequently, each processor core 2 sets the upper limit of power for the processor core 2.

In the following description, for ease of explanation, malfunction will be supposed to be caused when accumulated electric charge in the capacitor 27 become 0. However, as a physical phenomenon, it is thought that malfunction may be caused when voltage supplied to a circuit decreases by 10% or so. Consequently, it can be assumed that about 10% of accumulated electric charge in the capacitor 27 changes in a range where malfunction is not caused.

Therefore, in the following description, accumulated energy in the capacitor 27 proportional to the square of electric charge and so on will be used for calculation assuming it is linear. This is because the square of a value x which is small to some extent is sufficiently small and thus the square of (1+x) can be handled as 1+2x. For the same reason, accumulated electric charge in the capacitor 27 will be used for calculation as energy in the following description.

The multi-core processor 1 has a resistor, a capacitor and so on which are not shown in the drawings, and is configured to be able to execute arithmetic processing with power supplied from an external power supply (not shown). Referring to FIG. 1, the multi-core processor 1 has a plurality of processor cores 2-1, 2-2, . . . , 2-$m$ (hereinafter, referred to as processor cores 2 when not distinguished particularly), a shared cache 3, and an external I/O (Input/Output) connection part 4. In the following description, in a case where a plurality of identical components exist, they will be distinguished with numbers following hyphens, such as "xx-1" and "xx-2." Moreover, in a case where the identical components are not distinguished from each other, they will be denoted by "xx."

The processor core 2 is a circuit which executes arithmetic processing. As shown in FIG. 1, the processor core 2 has an arithmetic processing part 21, an instruction issuance restriction part 25, and a capacitor 27. The processor core 2 is connected to the shared cache 3 and the external I/O connection part 4 via the on-chip network 5.

The arithmetic processing part 21 executes given arithmetic processing. The capacitor 27 accumulates electric charge. The capacitor 27 supplies the electric charge accumulated therein when the arithmetic processing part 21 executes arithmetic processing. The instruction issuance restriction part 25 calculates energy accumulated in the capacitor 27, and controls the arithmetic processing part 21 on the basis of the calculation result.

The arithmetic processing part 21 and the instruction issuance restriction part 25 are realized, for example, when an arithmetic processing device which is included by the processor core 2 and not shown in the drawings executes a program stored by a storage device which is not shown in the drawings. The details of the arithmetic processing part 21 and the instruction issuance restriction part 25 will be described later.

The shared cache 3 is a storage device shared by the processor cores 2. The shared cache 3 is connected to an external memory 31, which is a memory outside the multi-core processor 1. The external memory 31 is, for example, a semiconductor memory such as a DRAM (Dynamic Random Access Memory). Meanwhile, the external memory 31 may be a storage element such as a SRAM (Static Random Access Memory) and a NAND flash memory.

The external I/O connection part 4 is connected to an external I/O 41. The external I/O 41 is, for example, PCI Express. The external I/O 41 may be other than PCI Express.

FIG. 2 is a diagram showing an example of the configuration of the processor core 2. As stated above, the processor core 2 has the arithmetic processing part 21, the instruction issuance restriction part 25, and the capacitor 27.

Referring to FIG. 2, the processor core 2 has, as the arithmetic processing part 21, an instruction fetching and decoding part 22, an instruction scheduling part 23, a plurality of instruction execution parts 24-1, 24-2, . . . , 24-$m$ (hereinafter, referred to as instruction execution parts 24 when not distinguished particularly), and an external component connection part 26.

The instruction fetching and decoding part 22 reads out instruction information from a main storage device (not illustrated), and analyzes the read-out instruction information. Then, the instruction fetching and decoding part 22 transmits the analyzed instruction information to the instruction scheduling part 23. Thus, a function which the instruction fetching and decoding part 22 has is a general one. Therefore, the detailed description of the instruction fetching and decoding part 22 will be omitted.

The instruction scheduling part 23 monitors the instruction execution part 24, and transmits instruction information to the instruction execution part 24. For example, the instruction scheduling part 23 monitors the instruction execution part 24 on the basis of the received instruction information, and monitors completion of execution of a preceding instruction. The instruction scheduling part 23 then transmits a prepared instruction to the instruction execution parts 24.

Further, when transmitting instruction information to the instruction execution part 24, the instruction scheduling part 23 transmits issued instruction information, which is information equivalent to the instruction information, to the instruction issuance restriction part 25. As described later, the instruction issuance restriction part 25 transmits an instruction issuance restriction direction to the instruction scheduling part 23 so that a given condition is satisfied, on the basis of the received issued instruction information. Upon receiving the instruction issuance restriction direction, the instruction scheduling part 23 decreases the rate of issuance of a new instruction or stops issuance of a new instruction depending on the content of the instruction issuance restriction direction.

The instruction execution part 24 has a cache memory and so on particular to a functional unit, a register file and a processor core. By using the components described above, the instruction execution part 24 executes an instruction on the basis of instruction information received from the instruction scheduling part 23.

In this exemplary embodiment, the processor core 2 includes a plurality of instruction execution parts 24. However, the number of the instruction execution parts 24 included by the processor core 2 may be one. Moreover, the functions of the instruction execution parts 24 included by the processor core 2 are not equivalent necessarily. The instruction execution parts 24 may be configured in a manner that, for example, one of the instruction execution parts 24 can execute an add instruction but cannot execute a memory access instruction, whereas another of the instruction execution parts 24 can execute a memory access instruction but cannot execute a branch instruction.

The external component connection part 26 is connected to the on-chip network 5. The external component connection part 26 is connected to the shared cache 3 and the external memory 31 placed outside the processor core 2, via the on-chip network 5.

The instruction issuance restriction part 25 receives issued instruction information from the instruction scheduling part 23 as stated above. On the basis of the issued instruction information, the instruction issuance restriction part 25 transmits an instruction issuance restriction direction to the instruction scheduling part 23 when a given condition is satisfied.

Referring to FIG. 2, the instruction issuance restriction part 25 is configured by a power control program 251, a consumed energy estimation part 252, and an instruction issuance rate determination part 253.

The power control program 251 receives power statistics information (power consumption information) for power estimation and power restriction information for the respective processor cores 2 from a debug interface such as JTAG (Joint Test Action Group), and controls the consumed energy estimation part 252 and the instruction issuance rate determination part 253.

Power statistics information (power consumption information) is information showing change of power consumption of a device responding to an instruction (change of power consumption caused in processing an instruction). In the multi-core processor 1 having the shared cache 3 and so on, one operation (e.g., execution of a load instruction or an add instruction) acts on a plurality of components such as the register, the functional unit, the cache memory (the shared cache 3) and the external memory 31. Thus, let us suppose in this exemplary embodiment that power statistics information is information showing at least change of power consumption of the processor core 2 and change of power consumption of a shared portion (the shared memory 3, the external memory 31, etc.) which the processor core 2 uses when executing an instruction. Power statistics information is acquired by, for example, observing change of power consumption of the whole device including the shared portion. Power statistics information is used when the consumed energy estimation part 252 calculates consumed energy.

Power restriction information is information showing supply (allocated electric energy) previously allocated to each of the processor cores 2. Power restriction information shows the maximum value of electric energy supplied to the processor core 2 during a given time. Power restriction information is used when the instruction issuance rate determination part 253 selects supplied energy.

The register for setting power statistical information and power restriction information on the power control program 251 may be mapped on a memory space and configured to be accessible via the on-chip network 5.

The consumed energy estimation part 252 calculates energy consumed by the processor core 2 in executing an instruction (consumed energy), on the basis of issued instruction information received from the instruction scheduling part 23 and power statistics information acquired from the power control program 251. Then, the consumed energy estimation part 252 transmits consumed energy information showing the calculation result (consumed energy) to the instruction issuance rate determination part 253.

The instruction issuance rate determination part 253 calculates the amount of accumulated energy accumulated in the capacitor 27 on the basis of consumed energy information received from the consumed energy estimation part 252 and power restriction information acquired from the power control program 251. The instruction issuance rate determination part 253 then outputs an instruction issuance restriction direction to the instruction scheduling part 23 when the amount of accumulated energy satisfies a given condition. As a result that the instruction issuance rate determination part 253 transmits an instruction issuance restriction direction to the instruction scheduling part 23, execution of a new instruction is restricted and power consumed by the processor core 2 is limited.

An instruction issuance restriction direction transmitted by the instruction issuance rate determination part 253 can be configured to include various instructions to the instruction scheduling part 23. For example, by transmitting an instruction issuance restriction direction to the instruction scheduling part 23, the instruction issuance rate determination part 253 can instructs decrease of the rate of issuance of a new instruction (throttling) or instructs halt of issuance of a new instruction.

The details of the instruction issuance restriction part 25 will be described below. First, the consumed energy estimation part 252 will be described in detail.

The consumed energy estimation part 252 calculates consumed energy, which is energy consumed under an instruction shown by issued instruction information, on the basis of the issued instruction information and power statistics information as stated above. The consumed energy estimation part 252 estimates consumed energy by using various sorts of information included in the issued instruction information.

The consumed energy estimation part 252 calculates energy to be consumed by using, for example, the kind of an operation showing addition, memory access or the like (I), the number of register files to be read out (Rn), the number of times of operations (N), and so on.

Meanwhile, the consumed energy estimation part 252 may be configured to calculate consumed energy by using information other than the above (e.g., the number of registers to be written). The number of times of operations (N) corresponds to an operator width in a SIMD (Single Instruction Multiple Data) instruction and a vector length in a vector instruction in a vector processor.

The abovementioned information is necessary because energy to be consumed changes depending on the information. For example, a SIMD instruction for executing a plurality of operations with one instruction is thought to consume more energy than a general instruction for executing one operation with one instruction. Moreover, even under the same operation instruction, there is a difference in number of times of referring to a register file between a case of reading out two operands from a register file and a case of reading out one operand from a register file and using an immediate value designated in the instruction as the other. Therefore, it is thought that there is a difference in energy consumed in execution of the instruction. Thus, the consumed energy estimation part 252 calculates consumed energy by using the information as mentioned above, for example.

Further, the consumed energy estimation part 252 previously calculates energy consumed for each kind of instruction (Ei) and energy consumed in reading out from a register (Eir) by using power statistics information.

Then, the consumed energy estimation part 252 calculates consumed energy by using the kind of an operation (I), the number of register files to be read (Rn), the number of times of operations (N), energy consumed for each kind of instruction (Ei) and energy consumed in reading out from a register (Eir) as described above. To be specific, the consumed energy estimation part 252 calculates consumed energy on the basis of the following equation, for example:

energy consumed under instruction(consumed energy)=$Ei \times N + Eir \times Rn \times N$ In this exemplary embodiment, consumed energy calculated by the consumed energy estimation part 252 is represented by an integer number. For example, the consumed energy estimation part 252 expresses by associating a numerical value "1" with 1 pJ. The integer number 1 expressed by the consumed energy estimation part 252 represents a specific amount of energy. Meanwhile, the consumed energy estimation part 252 may associate in a way other than illustrated above. For example, the consumed energy estimation part 252 may associate the numerical value "1" with 3 pJ.

Further, energy (Ei) consumed for each kind of instruction calculated by the consumed energy estimation part 252 includes energy consumed by the shared portion operating under the instruction. In other words, in response to an instruction such as a load/store instruction for which access to the on-chip network 5 and the shared cache 3 is expected, the consumed energy estimation part 252 calculates a probabilistic weighted energy value which considers the rate of access to the cache memory.

The consumed energy estimation part 252 calculates consumed energy in the abovementioned manner, for example. Then, the consumed energy estimation part 252 transmits consumed energy information showing the calculated consumed energy to the instruction issuance rate determination part 253.

Subsequently, the instruction issuance rate determination part 253 will be described in detail.

FIG. 3 shows an example of the configuration of the instruction issuance rate determination part 253. Referring to FIG. 3, the instruction issuance rate determination part 253 has an energy summation counter 2531, a power consumption history register 2532 (a consumed energy information storage part), an energy summation time saturating counter 2533, an inrush current restriction calculation part 2534 (an allowable electric energy calculation part), a minimum value selection logic 2535 (a supplied energy selection part), a power restriction time saturating counter 2536, an energy restriction counter 2537 (an accumulated energy amount calculation part), and a power restriction determination part 2538 (an instruction issuance limitation part).

As described later, consumed energy information received from the consumed energy estimation part 252 is used by the energy summation counter 2531 and the energy restriction counter 2537. Moreover, power restriction information acquired from the power restriction program 251 is used by the minimum value selection logic 2535.

Every time receiving consumed energy information, the energy summation counter 2531 adds the value of consumed energy shown by the consumed energy information. In other words, the energy summation counter 2531 calculates the summation value of consumed energy.

Further, the energy summation counter 2531 copies the calculated summation value of consumed energy to the power consumption history register 2532 every given time on the basis of an instruction from the energy summation time saturating counter 2533. Then, the energy summation counter 2531 clears the summation value of consumed energy. Thus, the energy summation counter 2531 is configured to calculate the summation value of consumed energy every given time and copy the summation value to the power consumption history register 2532.

The power consumption history register 2532 stores the summation value of consumed energy copied from the energy summation counter 2521 as summation consumed energy information a predetermined number of times. For example, the power consumption history register 2532 stores summation consumed energy information of three times copied from the energy summation counter 2531. The power consumption history register 2532 can be configured to store accumulated consumed energy information of any number of times equal to or more than one.

The energy summation time saturating counter 2533 executes control of a clear direction and a write direction on the energy summation counter 2531 and the power consumption history register 2532, respectively. The energy summation time saturating counter 2533 is configured to provide the above directions to the energy summation counter 2531 and the power consumption history register 2532, respectively every given time. For example, the energy summation time saturating counter 2533 is initialized at a preset specific value (C0) and subtracted by 1 every cycle. Then, when the value of the counter becomes 0, the energy summation time saturating counter 2533 outputs a clear direction and a write direction, and is set to the initial value C0 again.

With the combination of the three components described above (the energy summation counter 2531, the power consumption history register 2532, and the energy summation time saturating counter 2533), the summation value of consumed energy generated during a given time is found. Power is represented by temporal differentiation of consumed energy. Therefore, a value written in the power consumption history register 2532 shows consumed electric energy of the past.

The inrush current restriction calculation part 2534 calculates allowable electric energy with time evolution on the basis of summation consumed energy information stored by the power consumption history register 2532. The allowable electric energy is electric energy which is allowed to flow into the processor core 2, namely, electric energy which the processor core 2 is allowed to consume.

To be specific, for example, the inrush current restriction calculation part 2534 calculates a value obtained by adding predetermined electric energy to the average value of summation consumed energy information of the past three times stored by the power consumption history register 2532, thereby calculating allowable electric energy of a given time. Then, the inrush current restriction calculation part 2534 transmits the calculated allowable electric energy to the minimum value selection logic 2535.

As a result that the inrush current restriction calculation part 2534 calculates allowable electric energy in the above-mentioned manner, the following control becomes possible. For example, in a case where the most recent power consumption is 1 W or so, even if power of 10 W is allocated to the processor core 2 and the processor core 2 can utilize the power of 10 W, it is possible to control so that the processor core 2 utilizes up to 2 W at the maximum next time.

The inrush current restriction calculation part 2534 can be configured to calculate a predetermined minimum value when the power consumption history register 2532 does not store summation consumed energy information. Further, the inrush current restriction calculation part 2534 may be configured to calculate allowable electric energy by a method other than the method illustrated above. For example, the inrush current restriction calculation part 2534 may be configured to calculate a value two times the average value of summation consumed energy information, as allowable electric energy.

The minimum value selection logic 2535 selects, as supplied energy, the smaller electric energy of allowable electric energy received from the inrush current restriction calculation part 2534 and power restriction information allocated for each core designated from the power control program 251. Then, the minimum value selection logic 2535 transmits the selected electric energy (supplied energy) to the energy restriction counter 2537 at given time intervals on the basis of an instruction of the power restriction time saturating counter 2536.

The power restriction time saturating counter 2536 transmits an add instruction, which is an instruction to transmit the selected electric energy to the energy restriction counter 2537, to the minimum value selection logic 2535. The power restriction time saturating counter 2536 is configured to provide the above instruction every given time. The specific configuration of the power restriction time saturating counter 2536 is, for example, the same as the energy summation time saturating counter 2533 already described.

The energy restriction counter 2537 shows, for example, the amount of electric charge accumulated in the capacitor 27. For example, assuming the processor core 2 can operate until energy accumulated in the capacitor 27 is exhausted, the energy restriction counter 2537 shows the amount of the remaining energy (the amount of accumulated energy) which the processor core 2 can consume.

Upon receiving consumption energy information accompanying issuance of an instruction, the energy restriction counter 2537 subtracts a value based on the consumption energy information from the counter. In other words, the energy restriction counter 2537 is configured to subtract consumed energy accompanying issuance of an instruction from the counter.

Further, the energy restriction counter 2537 receives the value of electric energy (supplied energy) from the minimum value selection logic 2535 every given time, and adds the value to the counter. In other words, the energy restriction counter 2537 is configured to add the value of consumed energy allowed for the core (i.e., the value of supplied energy supplied to the core) every given time. For example, the processor core 2 capable of consuming power of 1 W can consume energy of 1 nJ per 1 ns. Therefore, the energy restriction counter 2537 adds a counter value representing 1 nJ per 1 ns on the basis of supplied energy selected by the minimum value selection logic 2535.

Thus, the energy restriction counter 2537 is configured to summate a subtraction term showing consumed energy and an addition term showing supplied energy which is electric energy selected by the minimum value selection logic 2535. The subtraction term corresponds to electric charge or energy consumed from the capacitor 27. On the other hand, the addition term corresponds to electric charge or energy flowing into the capacitor 27. According to the law of conservation of energy, it is through that once electric charge is accumulated, electric charge stays there unless power is consumed. Therefore, the energy restriction counter 2537 shows energy accumulated in the capacitor 27.

On the basis of the above idea, using any method of estimating the amount of inflowing electric charge and the amount of outflowing electric charge for the present invention is conceived. To be specific, for example, writing and calculating an equation considering influence of capacitor, coil and resistor of a power supply system with respect to a conceiving inflowing current.

Further, the energy restriction counter 2537 takes a counter value with the upper limit. In other words, in the case of a value exceeding a maximum value previously set in the addition process, the maximum value is stored into the energy restriction counter 2537. Moreover, the upper limit value of the energy restriction counter 2537 corresponds to electric charge which can be accumulated in the capacitor 27. Therefore, energy consumption in burst is allowed up to a count value of the energy restriction counter 2537. Meanwhile, the energy restriction counter 2537 can be configured to consider existence of a capacitor provided on the periphery of the processor core 2. In this case, the upper limit value of the energy restriction counter 2537 becomes a value considering electric charge which can be accumulated in the peripheral capacitor.

Further, it is not supposed to occur in principle that the value of the energy restriction counter 2537 overflows in the negative direction. Therefore, when the abovementioned case occurs, it is determined that a failure is occurring.

The power restriction determination part 2538 monitors the counter value of the energy restriction counter 2537. Then, the power restriction determination part 2538 outputs an instruction issuance restriction direction on the basis of the counter value of the energy restriction counter 2537. For example, when the counter value of the energy restriction counter 2537 becomes a negative numerical value, the power restriction determination part 2538 determines power exceeds a predetermined value and outputs an instruction issuance restriction direction. Consequently, issuance of a new instruction is restricted as stated above.

Meanwhile, the power restriction determination part 2538 may be configured to, for example, previously store one restriction threshold or a plurality of restriction thresholds and output an instruction issuance restriction direction on the basis of the result of comparison between the restriction thresholds and the counter value of the energy restriction counter 2537. For example, the power restriction determination part 2538 decreases the rate of instruction issuance in a case where the counter value of the energy restriction counter 2537 becomes lower than a certain restriction threshold 1 (e.g., changes an instruction issuance interval to 10 cycles when the counter value becomes equal to or less than 10). Moreover, the power restriction determination part 2538 stops issuance of an instruction in a case where the counter value of the energy restriction counter 2537 becomes lower than a certain restriction threshold 2, which is a smaller threshold than the restriction threshold 1 (e.g., forbids issuance of an instruction when the counter value becomes negative). The power restriction determination part 2538 may be configured in the abovementioned manner, for example.

Further, as stated above, the energy restriction counter 2537 is configured to receive the value of electric energy (supplied energy) from the minimum value selection logic 2535 every given time and add the value to the counter. Therefore, when a given time passes after the power restriction determination part 2538 outputs an instruction issuance restriction direction, the counter value of the energy restriction counter 2537 increases, and there is no factor for the power restriction determination part 2538 to output an instruction issuance restriction direction. As a result, issuance of an instruction is restarted.

That is an example of the configuration of the multi-core processor 1.

In this exemplary embodiment, the energy summation counter 2531 summates consumed energy on the basis of consumed energy information. However, another method may be employed as far as consumed energy can be estimated by the method.

For example, the energy summation counter 2531 may be configured to add the total of supplied electric energy added to the energy restriction counter 2537 as consumed energy. To be specific, for example, the energy summation counter 2531 can be configured to, when adding electric energy selected by the minimum selection logic 2535 to the energy restriction counter 2537, summate an energy value calculated by the following equation:

$$\text{value added to energy summation counter} = \text{MIN}(\text{Max}Ee, Ee+Ep) - Ee, \text{ where:}$$

$Ee$=the counter value of the energy restriction counter 2537,
$Ep$=electric energy selected by the minimum value selection logic 2535, and
$\text{Max}Ee$=the upper limit value of the energy restriction counter 2537.

Next, the operation of the processor core 2 will be described. As shown in FIG. 4, the processor core 2 in this exemplary embodiment operates in almost the same manner as a general processor.

That is to say, referring to FIG. 4, the instruction fetching and decoding part 22 acquires instruction information from the main storage device and decodes the instruction information. Then, the instruction fetching and decoding part 22 transmits the decoded instruction information to the instruction scheduling part 23 (step S101).

Subsequently, the instruction scheduling part 23 checks a dependency relation with preceding and succeeding instructions, and transmits the instruction information to the instruction execution part 24 (step S102). After that, the instruction execution part 24 executes an instruction on the basis of the received instruction information (step S103).

The processor core 2 performs almost the same operation as a general processor as described above, for example. However, the processor core 2 in this exemplary embodiment operates in a different way from a general processor in the following point.

Referring to FIG. 5, the instruction scheduling part 23 transmits issued instruction information to the instruction issuance restriction part 25 when transmitting instruction information to the instruction execution part 24 (step S201).

Subsequently, the instruction issuance restriction part 25 receives the issued instruction information. Then, the consumed energy estimation part 252 of the instruction issuance restriction part 25 calculates consumed energy on the basis of the issued instruction information and power statistical information acquired from the power restriction program 251 (step S202). Then, the consumed energy estimation part 252 transmits consumed energy information showing the consumed energy to the instruction issuance rate determination part 253.

After that, the instruction issuance rate determination part 253 receives the consumed energy information. Then, the instruction issuance rate determination part 253 calculates the amount of accumulated energy on the basis of the received consumed energy information and power restriction information acquired from the power restriction program 251 (step S203). Then, the instruction issuance rate determination part 253 outputs an instruction issuance restriction direction on the basis of the calculated amount of accumulated energy (step S204).

The instruction issuance restriction direction output by the instruction issuance rate determination part 253 is transmitted to the instruction scheduling part 23. Then, upon receiving the instruction issuance restriction direction, the instruction scheduling part 23 restricts issuance of a new instruction on the basis of the received instruction issuance restriction direction (step S205).

Thus, the processor core 2 in this exemplary embodiment calculates consumed energy on the basis of issued instruction information, and calculates the amount of accumulated energy accumulated in the capacitor 27 on the basis of the calculated consumed energy. Then, the processor core 2 restricts issuance of a new instruction on the basis of the amount of accumulated energy.

Subsequently, the operation of the instruction issuance rate determination part 253 in calculating the amount of accumulated energy accumulated in the capacitor 27 will be described.

Referring to FIG. 6, in the energy restriction counter 2537 of the instruction issuance rate determination part 253, every time a given time passes (step S301: Yes), electric energy selected by the minimum value selection logic 2535 is added (step S302). On the other hand, in the energy restriction counter 2537, every time consumed energy information is received (step S303: Yes), consumed energy shown by the consumed energy information is subtracted (step S304).

Thus, the amount of accumulated energy is calculated on the basis of electric energy added every given time (supplied energy) and consumed energy subtracted every time consumed energy information is received (every time an instruction is issued).

Subsequently, the operation performed from reception of consumed energy information by the instruction issuance rate determination part 253 to selection of electric energy by the minimum value selection logic 2535 will be described.

Referring to FIG. 7, when the instruction issuance rate determination part 253 acquires consumed energy information, the energy summation counter 2531 calculates a summation value of consumed energy of a given time (step S401). Then, the energy summation counter 2531 stores the summation value of the summated consumed energy into the power consumption history register 2532 as summation consumed energy information.

Subsequently, the inrush current restriction calculation part 2534 calculates allowable electric energy by adding predetermined electric energy to the average value of the summation consumed energy information stored in the power consumption history register 2532 (step S402). Then, the inrush current restriction calculation part 2534 transmits the calculated allowable electric energy to the minimum value selection logic 2535.

Upon receiving the allowable electric energy, the minimum value selection logic 2535 compares the allowable electric energy with power restriction information (step S403).

In a case where the allowable electric energy is larger than power restriction information (step S403: Yes), the minimum value selection logic 2535 selects the electric energy shown by the power restriction information as supplied energy (step S404). On the other hand, in a case where the allowable electric energy is equal to or less than the power restriction information (step S403: No), the minimum value selection logic 2535 selects the allowable electric energy as supplied energy (step S405).

Through the operation as described above, the minimum value selection logic 2535 selects supplied energy. Then, the supplied energy selected by the minimum value selection logic 2535 is added to the energy restriction counter 2537 every given time (step S406).

That is the description of the operation of the processor core 2.

Now, the mechanism of malfunction of the electronic circuit (the processor core 2) considering a capacitor and control executed when the capacitor is considered will be described.

Figure 8:
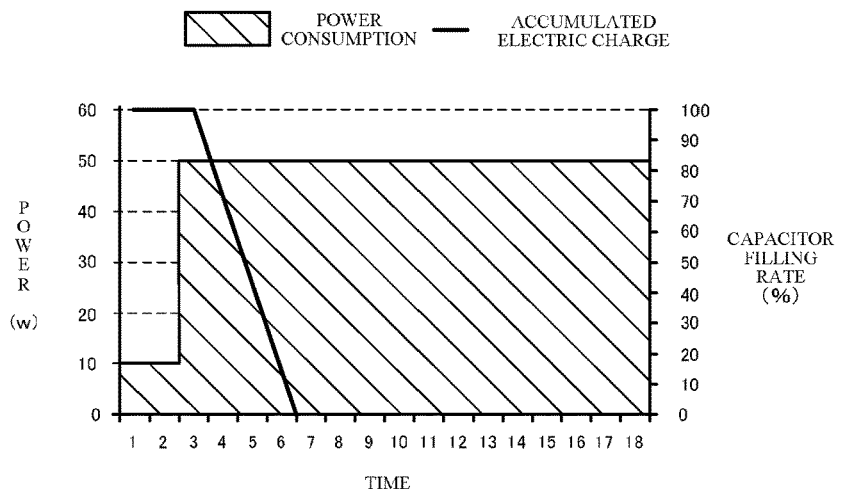
FIG. 8 is a graph showing an example of the relation between accumulated electric charge in a capacitor and power consumption in a circuit having the capacitor.

FIG. 8 shows electric charge accumulated in a capacitor in a case where a circuit having the capacitor increases power consumption from 10 W to 50 W, which exceeds a rating (20 W), at time 3 and keeps an operation rate of consuming 50 W.

In the case shown in FIG. 8, it is possible to use the electric charge accumulated in the capacitor at times 3, 4, 5 and 6. Therefore, the electronic circuit can normally operate by using the electric charge accumulated in the capacitor. On the other hand, at time 7, the electric charge accumulated in the capacitor is 0. Therefore, in this case, the electronic circuit is supposed to cause malfunction at time 7.

Figure 9:
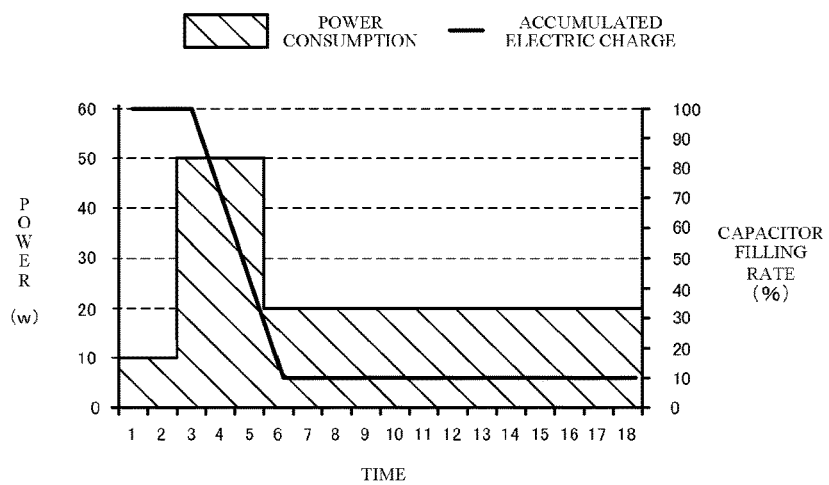
FIG. 9 is a graph showing an example of the relation between accumulated electric charge in a capacitor and power consumption in a circuit having the capacitor.

Judging from the above, the circuit can be kept from malfunctioning in a case where power consumption exceeds the rating but returns to the rating of 20 W before the electric charge in the capacitor is exhausted as shown in FIG. 9, for example. In other words, execution of control considering the capacitor as described above allows control so that power more than the rating can be temporarily used without malfunction.

The abovementioned control is thought to be greatly effective in a case where operation is periodic and power consumption increases and decreases alternately depending on time.

Figure 10:
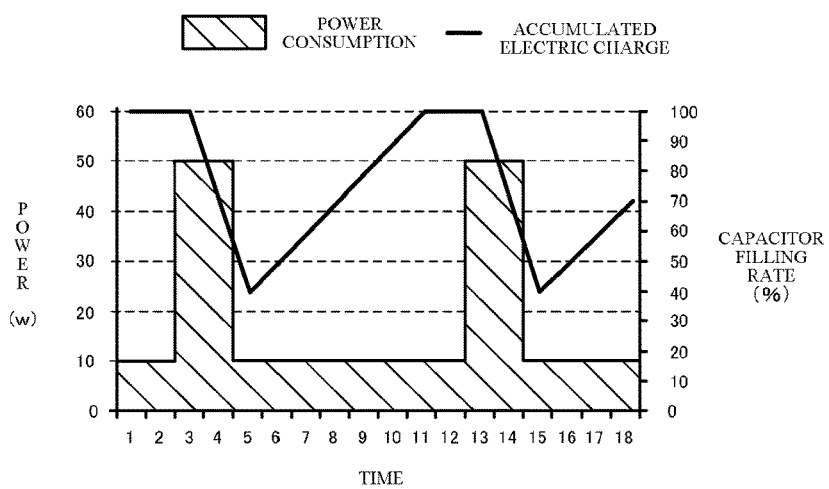
FIG. 10 is a graph showing an example of the relation between accumulated electric charge in a capacitor and power consumption in a circuit having the capacitor.

For example, let us suppose a process which needs power consumption of 50 W only at times 3 and 4 as shown in FIG. 10. Moreover, let us suppose a case where, after the abovementioned process, a low operation rate period in which operation is possible with 10 W is kept and a process which needs 50 W is executed again.

In this case, the capacitor is taken into consideration, so that sufficient electric charge is left in the capacitor at time 4 and hence there is no need to execute power control. Moreover, the electric charge consumed at times 3 and 4 recovers during a period that power consumption is 10 W. Therefore, the circuit operates without any problem even when again executing a process which needs 50 W. Therefore, in the above case, there is no need to execute control for limiting power consumption.

Figure 11:
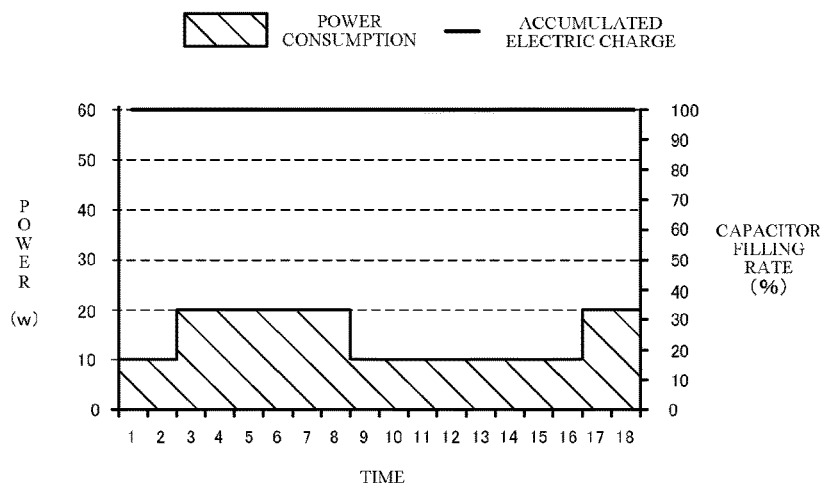
FIG. 11 is a graph showing an example of control without consideration of a capacitor.

On the other hand, in a case where the capacitor is not taken into consideration, power consumption is controlled to keep the rating of 20 W as shown in FIG. 11, for example. In this case, power consumption for the process executed at times 3 and 4 shown in FIG. 10 is restricted to 20 W. Therefore, the process does not complete until time 8, and a situation that a succeeding process also delays is supposed to occur.

By thus controlling power consumption while considering a capacitor, it is possible to precisely control power consumption of an electronic circuit without executing unnecessary control.

As described heretofore, the processor core 2 in this exemplary embodiment has the capacitor 27. Such a configuration enables the processor core 2 to execute arithmetic processing while considering energy accumulated in the capacitor 27. As a result, the processor core 2 can execute arithmetic processing without restricting issuance of a new instruction even if power consumption exceeds the rating.

Further, the processor core 2 has the consumed energy estimation part 252 and the instruction issuance rate determination part 253. The instruction scheduling part 23 is configured to transmit issued instruction information to the instruction issuance restriction part 25, and the power control program 251 is configured to acquire power statistical information and power restriction information. Such a configuration allows the instruction issuance restriction part 25 to calculate consumed energy appropriate for an instruction on the basis of the issued instruction information and the power statistical information. Moreover, the instruction issuance rate determination part 253 can calculate the amount of accumulated energy on the basis of the consumed energy and the power restriction information. As a result, the instruction issuance rate determination part 253 can transmit an instruction issuance restriction direction on the basis of the amount of accumulated energy. Consequently, the processor core 2 can restrict power consumption in consideration of electric charge accumulated in the capacitors inside and outside the chip and, for example, in a case where a processing time is sufficiently short (a process ends before power accumulated in the capacitors is exhausted), the processor core 2 can execute control such as consuming power exceeding a rating and completing calculation at high speeds. In other words, the processor core 2 can precisely control power consumption of an electronic circuit without executing unnecessary control.

Further, the processor core 2 in this exemplary embodiment has the inrush current restriction calculation part 2534 and the minimum value selection logic 2535. Such a configuration allows the inrush current restriction calculation part 2534 to calculate allowable electric energy on the basis of the consumed energy. Moreover, the minimum value selection logic 2535 can select, as supplied energy, electric energy which is the smaller in value of the allowable electric energy calculated by the inrush current restriction calculation part 2534 and the electric energy shown by the power restriction information. As a result, for example, in a case where the most recent power consumption is about 1 W, the processor core 2 can execute control so as to use only 2 W at the maximum next time even if usable power allocated to the processor core 2 is 10 W. When power consumption of the circuit drastically changes, the amount of current flowing in the circuit drastically changes. Consequently, voltage drops largely, and there is a probability that malfunction is caused. Therefore, as a result that the minimum value selection logic 2535 selects electric energy which is the smaller in value of the allowable electric energy and the electric energy shown by the power restriction information as stated above, it is possible to decrease the probability of malfunction due to voltage drop.

Further, in order to decrease the probability of malfunction mentioned above, it can be thought to, for example, increase the number of capacitors, or restrict the number of implementable transistors. On the other hand, because the present invention includes the inrush current restriction calculation part 2534 and the minimum value selection logic 2535 as stated above, it is possible to reduce the probability of malfunction without adjustment of the capacitors or transistors as described above. In other words, because the processor core 2 in this exemplary embodiment has the inrush current restriction calculation part 2534 and the minimum value selection logic 2535, it is possible to decrease the probability of malfunction without excessively increasing the number of the capacitors or limiting the number of the transistors.

Further, the multi-core processor 1 in this exemplary embodiment includes a plurality of processor cores 2. Each of the processor cores 2 is configured to calculate consumed energy on the basis of issued instruction information corresponding to an instruction issued by the processor core 2 and power statistical information. Such a configuration allows each of the processor cores 2 included by the multi-core processor 1 to manage the consumed energy of the processor core 2 on the basis of an instruction issued by the processor core 2. As a result, it is possible to restrict power consumption for each of the processor cores 2.

Further, power statistical information used by the processor core 2 shows at least change of power consumption of the core in execution of arithmetic processing and the shared portion used in execution of arithmetic processing. As stated above, the processor core 2 is configured to calculate consumed energy by using an instruction issued by the processor core 2 and power statistical information. Such a configuration allows the processor core 2 to calculate consumed energy on the basis of issued instruction information without being provided with a network for collection of power consumption information of components including the shared portion such as the shared cache 3 and the external memory 31 used in execution of arithmetic processing. Therefore, the abovementioned configuration allows reduction of the cost of providing the network for collection of power consumption information. Moreover, as stated above, the power statistical information also shows change of power of the shared portion. Therefore, each of the processor cores 2 can control power consumption in consideration of power consumption of the shared portion and so on used when the processor core 2 executes arithmetic processing. As a result, it is possible to execute more precise control of power consumption.

In this exemplary embodiment, the consumed energy estimation part 252 calculates consumed energy by using the kind of an instruction, the number of registers to be written and read, a vector length, and so on. However, the consumed energy estimation part 252 can be configured to calculate consumed energy by using a value other than the above values. For example, the consumed energy estimation part 252 can be configured to calculate consumed energy by using the presence/absence of predication (mask), the presence/absence of cache hit, a performance counter value, and so on.

For example, some processors each have a performance counter for measuring the rate of cache hit. In this case, it is thought that the consumed energy estimation part 252 changes an estimation value of consumed energy of a load/store instruction referring to the value of the performance counter.

Further, the consumed energy estimation part 252 may be configured not to receive power statistical information from the power control program 251. In this case, the consumed energy estimation part 252 calculates consumed energy on the basis of a predetermined value and issued instruction information, for example.

Further, a configuration that the value of accumulation consumed energy information stored in the power consumption history register 2532 can be referred to from outside is possible. Such a configuration makes it possible to, for example, estimate the amount of generated heat from the value of accumulation consumed energy information and regulate air conditioning of a machine room on the basis of the estimated heat generation amount.

Further, in this exemplary embodiment, malfunction is caused when electric charge accumulated in a capacitor becomes 0. However, as a physical phenomenon, malfunction may be caused when voltage supplied to a circuit decreases about 10%. Therefore, the power restriction determination part 2538 may be configured to output an instruction issuance restriction direction at a stage that the counter value of the energy restriction counter 2537 changes about 10%. Thus, the timing for output of an instruction issuance restriction direction by the power restriction determination part 2538 is not limited to a case where the counter value of the energy restriction counter 2537 becomes negative or less than 10.

Further, in this exemplary embodiment, the instruction issuance restriction part 25 transmits an instruction issuance restriction direction on the basis of the amount of accumulated energy accumulated in the capacitor 27. However, the instruction issuance restriction part 25 may be configured to transmit an instruction issuance restriction direction also in consideration of the existence of a capacitor provided on the periphery of the processor core 2.

Second Exemplary Embodiment

Figure 12:
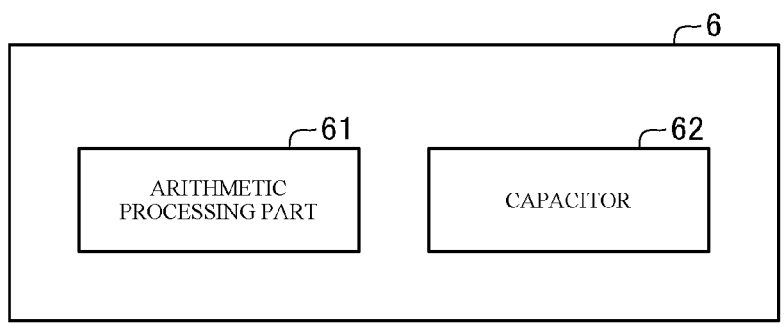
FIG. 12 is a schematic block diagram showing the overview of the configuration of an electronic circuit according to a second exemplary embodiment of the present invention.

A second exemplary embodiment of the present invention will be described referring to FIG. 12. FIG. 12 is a schematic block diagram showing an example of the configuration of an electronic circuit 6.

Referring to FIG. 12, the electronic circuit 6 has an arithmetic processing part 61 and a capacitor 62.

The capacitor 62 can accumulate electric charge. The capacitor 62 supplies the accumulated electric charge when the arithmetic processing part 61 executes arithmetic processing.

The arithmetic processing part 61 executes predetermined arithmetic processing. The arithmetic processing part 61 can execute the predetermined arithmetic processing by operating with electric charge supplied from the capacitor 62.

Thus, the electronic circuit 6 in this exemplary embodiment has the arithmetic processing part 61 and the capacitor 62. Such a configuration enables the arithmetic processing part 61 of the electronic circuit 6 to operate with electric charge accumulated in the capacitor 62. As a result, the electronic circuit 6 can continue arithmetic processing without restricting issuance of a new instruction even if power consumption of the arithmetic processing part 61 exceeds a rating.

Further, the electronic circuit 6 can be realized by installation of a given program in the electronic circuit 6. To be specific, a program as another aspect of the present invention is a program including instructions for causing an information processing device, which has a capacitor supplying accumulated electric charge when an arithmetic processing unit executes arithmetic processing, to realize the arithmetic processing unit executing given arithmetic processing, and the arithmetic processing unit executes arithmetic processing depending on the accumulated electric charge in the capacitor.

Further, an arithmetic processing control method executed by operation of the electronic circuit 6 described above is a method of accumulating electric charge supplied from an external power supply device into a capacitor and executing predetermined arithmetic processing by operating with the supplied charge.

Further, the same effect as the electronic circuit 6 can also be realized by a multi-core processor having a given configuration. To be specific, a multi-core processor as another aspect of the present invention is a multi-core processor having a plurality of processor cores, the processor cores each including an arithmetic processing part executing given arithmetic processing and a capacitor supplying accumulated electric charge when the arithmetic processing part executes arithmetic processing, and the arithmetic processing part executes arithmetic processing depending on electric charge accumulated in the capacitor.

The program, arithmetic processing control method, and multi-core processor having the abovementioned configurations have the same action as the electronic circuit 6, and therefore, can achieve the object of the present invention.

Third Exemplary Embodiment

Figure 13:
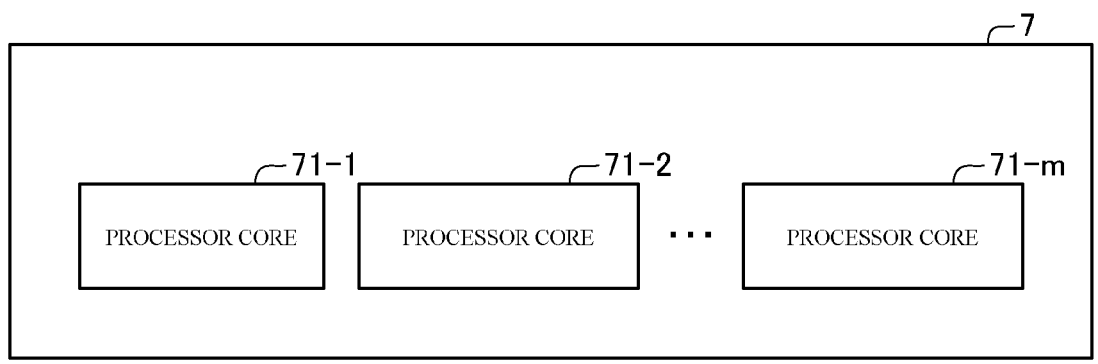
FIG. 13 is a schematic block diagram showing the overview of the configuration of a multi-core processor according to a third exemplary embodiment of the present invention.

A third exemplary embodiment of the present invention will be described referring to FIG. 13. FIG. 13 is a schematic block diagram showing an example of the configuration of a multi-core processor 7.

Referring to FIG. 13, the multi-core processor 7 has a plurality of processor cores 71-1, 71-2, ..., 71-$m$ (hereinafter, referred to as processor cores 71 when not distinguished particularly).

The processor core 71 calculates consumed energy which is energy consumed when an instruction issued thereby is executed, on the basis of issued instruction information showing an instruction issued by the processor core 71 and power consumption information showing change of power consumption caused in executing processing appropriate for the instruction. In other words, each of the processor cores 71 included by the multi-core processor 7 is configured to calculate consumed energy which is energy consumed when an instruction processed thereby is executed.

Thus, the multi-core processor 7 in this exemplary embodiment is configured so that the processor cores 71 each calculate consumed energy on the basis of issued instruction information and power statistical information. Such a configuration enables each of the processors 7 to limit issuance of a new instruction on the basis of the calculated consumed energy. That is to say, the abovementioned configuration enables each of the processor cores 7 to control the upper limit of power consumption. As a result, it is possible to more precisely control power consumption.

Further, because the processor cores 7 each calculate consumed energy on the basis of issued instruction information and power statistical information, it becomes possible to calculate consumed energy without providing a network for collecting power consumption information of each component. As a result, it becomes possible to reduce the cost of providing the power consumption network.

<Supplementary Notes>

The whole or part of the exemplary embodiments disclosed above can be described as the following supplementary notes. Below, the overview of an electronic circuit and so on of the present invention will be described. However, the present invention will not be limited to the following configurations.

(Supplementary Note 1)

An electronic circuit comprising:

an arithmetic processing part executing given arithmetic processing; and a capacitor supplying accumulated electric charge when the arithmetic processing part executes arithmetic processing, wherein the arithmetic processing part operates by using the electric charge supplied from the capacitor.

(Supplementary Note 2)

The electronic circuit according to Supplementary Note 1, comprising:

a consumed energy estimation part calculating consumed energy on a basis of an instruction issued by the arithmetic processing part, the consumed energy being energy consumed when arithmetic processing appropriate for the instruction is executed; and an accumulated energy amount calculation part calculating an amount of accumulated energy on a basis of the calculated consumed energy and supplied energy supplied to the electronic circuit, the amount of accumulated energy being an amount of energy accumulated in the capacitor.

According to this configuration, the electronic circuit includes the consumed energy estimation part and the accumulated energy amount calculation part. With such a configuration, the consumed energy estimation part can calculate consumed energy appropriate for an instruction. Further, the accumulated energy amount calculation part can calculate the amount of accumulated energy accumulated by a capacitor on the basis of the calculated consumed energy and supplied energy. As a result, the electronic circuit can control power consumption in consideration of the amount of accumulated energy accumulated by the capacitor. Consequently, it becomes possible to precisely control power consumption of the electronic circuit without executing unnecessary control.

(Supplementary Note 3)

The electronic circuit according to Supplementary Note 2, comprising:

an allowable electric energy calculation part calculating allowable electric energy on a basis of the consumed energy, the allowable electric energy being electric energy which the electronic circuit is allowed to consume, wherein the accumulated energy amount calculation part calculates the amount of accumulated energy on a basis of the consumed energy and the supplied energy, the supplied energy being selected on a basis of the allowable electric energy.

According to this configuration, the electronic circuit includes the allowable electric energy calculation part. With such a configuration, the allowable electric energy calculation part can calculate allowable electric energy on the basis of consumed energy. Further, the accumulated energy amount calculation part can calculate the amount of accumulated energy on the basis of the consumed energy and supplied energy which is selected on the basis of the allowable electric energy. As a result, it becomes possible to control supplied energy on the basis of consumed energy. Consequently, it becomes possible to prevent power consumption of the circuit from radically changing, and it becomes possible to reduce the probability of malfunction due to voltage drop.

(Supplementary Note 4)

The electronic circuit according to Supplementary Note 3, comprising:

a supplied energy selection part selecting, as the supplied energy, electric energy having a smaller value of the allowable electric energy and allocated electric energy, the allocated electric energy being supply previously allocated to the electronic circuit.

(Supplementary Note 5)

The electronic circuit according to Supplementary Note 3 or 4, comprising:

a consumed energy information storage part storing a summation value of the consumed energy occurring within a given time as summation consumed energy information, wherein the allowable electric energy calculation part calculates the allowable electric energy by summating an average value of the summation consumed energy information stored in the consumed energy information storage part and a predetermined value.

(Supplementary Note 6)

The electronic circuit according to any of Supplementary Note 2 to 5, wherein:

the consumed energy estimation part calculates the consumed energy on a basis of issued instruction information and power consumption information, the issued instruction information representing the issued instruction, and the power consumption information representing change of power consumption in issuance of an instruction.

According to this configuration, the consumed energy estimation part calculates consumed energy on the basis of issued instruction information and power consumption information. As a result, it becomes possible to calculate consumed energy without providing a network for collecting power consumption of the respective components including a shared portion. Consequently, it becomes possible to reduce the cost of providing the power consumption collection network.

(Supplementary Note 7)

The electronic circuit according to Supplementary Note 6, wherein:

the consumed energy estimation part calculates energy consumed for each kind of instruction and energy consumed in reading a register on a basis of the power consumption information, and calculates the consumed energy on a basis of the calculated energy consumed for each kind of instruction, the calculated energy consumed in reading the register, and the issued instruction information.

(Supplementary Note 8)

The electronic circuit according to Supplementary Note 6 or 7, wherein:

the power consumption information represents change of power consumption of at least the electronic circuit and a shared portion used by the electronic circuit.

According to this configuration, the power consumption information represents change of power consumption of at least the electronic circuit and the shared portion used by the electronic circuit. With this configuration, it becomes possible to control power consumption in consideration of power consumption of the shared portion and so on used by the electronic circuit in executing arithmetic processing. As a result, it becomes possible to more precisely control power consumption.

(Supplementary Note 9)

The electronic circuit according to any of Supplementary Notes 2 to 8, comprising:

an instruction issuance limitation part directing limitation of issuance of a new instruction on a basis of the amount of accumulated energy calculated by the accumulated energy amount calculation part.

According to this configuration, the electronic circuit includes the instruction issuance limitation part. With this configuration, the instruction issuance limitation part can direct limitation of issuance of a new instruction on the basis of the amount of accumulated energy. As a result, it becomes possible to control power consumption in consideration of the amount of accumulated energy.

(Supplementary Note 10)

The electronic circuit according to Supplementary Note 9, wherein:

the instruction issuance limitation part limits issuance of a new instruction on a basis of a result of comparison of the amount of accumulated energy with a predetermined restriction threshold.

(Supplementary Note 11)

The electronic circuit according to any of Supplementary Notes 2 to 10, wherein:

the accumulated energy amount calculation part calculates the amount of accumulated energy by adding the supplied energy every given time and subtracting the consumed energy every time an instruction is issued.

(Supplementary Note 12)

The electronic circuit according to any of Supplementary Notes 2 to 11, wherein:

the amount of accumulated energy calculated by the accumulated energy amount calculation part is set such that an upper limit becomes a finite value.

(Supplementary Note 13)

An arithmetic processing control method comprising:

causing an accumulator to accumulate electric charge supplied from an external power supply device;

supplying the accumulated electric charge; and operating by using the supplied electric charge and thereby executing given arithmetic processing.

(Supplementary Note 14)

The arithmetic processing control method according to Supplementary Note 13, comprising:

calculating consumed energy on a basis of an issued instruction, the consumed energy being energy consumed when arithmetic processing appropriate for the instruction is executed; and calculating an amount of accumulated energy on a basis of the calculated consumed energy and supplied energy supplied to an electronic circuit, the amount of accumulated energy being an amount of energy accumulated in the capacitor.

(Supplementary Note 15)

The arithmetic processing control method according to Supplementary Note 14, comprising:

calculating allowable electric energy on a basis of the consumed energy, the allowable electric energy being electric energy which the electronic circuit is allowed to consume; and calculating the amount of accumulated energy on a basis of the consumed energy and the supplied energy, the supplied energy being selected on a basis of the allowable electric energy.

(Supplementary Note 16)

The arithmetic processing control method according to Supplementary Note 14 or 15, comprising:

directing limitation of issuance of a new instruction on a basis of the amount of accumulated energy.

(Supplementary Note 17)

A non-transitory computer-readable medium storing a program comprising instructions for causing an information processing device having a capacitor supplying accumulated electric charge when an arithmetic processing unit executes arithmetic processing to realize:

an arithmetic processing unit executing given arithmetic processing, wherein the arithmetic processing unit operates by using the electric charge supplied from the capacitor.

(Supplementary Note 18)

The non-transitory computer-readable medium storing the program according to Supplementary Note 17, the program comprising instructions for realizing:

a consumed energy estimation unit calculating consumed energy on a basis of an issued instruction, the consumed energy being energy consumed when arithmetic processing appropriate for the instruction is executed; and an accumulated energy amount calculation unit calculating an amount of accumulated energy on a basis of the calculated consumed energy and supplied energy supplied to an electronic circuit, the amount of accumulated energy being an amount of energy accumulated in a capacitor accumulating electric charge consumed by the electronic circuit.

(Supplementary Note 19)

The non-transitory computer-readable medium storing the program according to Supplementary Note 18, the program comprising instructions for realizing:

an allowable electric energy calculation unit calculating allowable electric energy on a basis of the consumed energy, the allowable electric energy being electric energy which the electronic circuit is allowed to consume, wherein the accumulated energy amount calculation unit calculates the amount of accumulated energy on a basis of the consumed energy and the supplied energy, the supplied energy being selected on a basis of the allowable electric energy.

(Supplementary Note 20)

The non-transitory computer-readable medium storing the program according to Supplementary Note 18 or 19, the program comprising instructions for realizing:

an instruction issuance limitation unit directing limitation of issuance of a new instruction on a basis of the amount of accumulated energy calculated by the accumulated energy amount calculation unit.

(Supplementary Note 21)

A multi-core processor having a plurality of processor cores, each of the processor cores comprising:

an arithmetic processing part executing given arithmetic processing; and a capacitor supplying accumulated electric charge when the arithmetic processing part executes arithmetic processing, wherein the arithmetic processing part operates by using the electric charge supplied from the capacitor.

The program described in the exemplary embodiments and the supplementary notes is stored in a storage device, or recorded on a computer-readable recording medium. For example, the recording medium is a portable medium such as a flexible disk, an optical disk, a magneto-optical disk, and a semiconductor memory.

Although the present invention has been described above referring to the exemplary embodiments, the present invention is not limited to the above exemplary embodiments. The configurations and details of the present invention can be changed in various manners one skilled in the art within the scope of the present invention.

The invention claimed is:

1. An electronic circuit comprising:
a processing core; and
a capacitor to supply stored accumulated energy to the processing core,
wherein the processing core is to:
store overall actual energy consumed by the processing core over time;
calculate an allowable energy that the electronic circuit is permitted to consume, as a sum of a predetermined value and an average of the overall actual energy consumed by the processing core over time;
calculate estimated energy that the processing core will consume to execute an issued instruction, based on actual energy consumed by the processing core when previously responding to the issued instruction;
determine the stored accumulated energy supplied by the capacitor when the processing core executes the issued instruction, based on the allowable energy that the electronic circuit is permitted to consume, the stored accumulated energy less than the allowable energy that the electronic circuit is permitted to consume; and
execute the issued instruction,
wherein the capacitor is to supply the stored accumulated energy to the processing core while the issued instruction is being executed.

2. The electronic circuit according to claim 1, wherein the processing core is to further:
determine energy allocated to the electronic circuit as a smaller of the allowable energy that the electronic circuit is permitted to consume and previously allocated energy to the electronic circuit.

3. The electronic circuit according to claim 1, wherein the processing core is to further:
limit issuance of a new instruction, based on the accumulated energy stored in the capacitor.

4. The electronic circuit according to claim 3, wherein the processing core is to limit the issuance of the new instruction based on the accumulated energy stored in the capacitor in comparison to a restriction threshold.

5. A method comprising:
storing, by a capacitor of an electronic circuit, accumulated energy;
supplying, by the capacitor, the accumulated energy to a processing core of the electronic circuit;
storing, by the processing core, overall actual energy consumed by the processing core over time;
calculating, by the processing core, an allowable energy that the electronic circuit is permitted to consume, as a sum of a predetermined value and an average of the overall actual energy consumed by the processing core over time;
calculating, by the processing core, estimated energy that the processing core will consume to execute an issued instruction, based on actual energy consumed by the processing core when previously responding to the issued instruction;
determining, by the processing core, the stored accumulated energy supplied by the capacitor when the processing core executes the issued instruction, based on the allowable energy that the electronic circuit is permitted to consume, the stored accumulated energy less than the allowable energy that the electronic circuit is permitted to consume; and
executing, by the processing core, the issued instruction while being supplied the stored accumulated energy from the capacitor.

6. The method according to claim 5, further comprising:
limiting, by the processing core, issuance of a new instruction, based on the accumulated energy stored in the capacitor.

7. A non-transitory computer-readable medium storing instructions performed by a processing core of an electronic circuit to:
store overall actual energy consumed by the processing core over time;
calculate an allowable energy that the electronic circuit is permitted to consume, as a sum of a predetermined value and an average of the overall actual energy consumed by the processing core over time;
calculate estimated energy that the processing core will consume to execute an issued instruction, based on actual energy consumed by the processing core when previously responding to the issued instruction;
determine stored accumulated energy supplied by a capacitor when the processing core executes the issued instruction, based on the allowable energy that the electronic circuit is permitted to consume, the stored accumulated energy less than the allowable energy that the electronic circuit is permitted to consume; and
execute the issued instruction while being supplied the stored accumulated energy from the capacitor.

8. The non-transitory computer-readable medium storing the program according to claim 7, wherein the instructions are performed by the processing core to further:
limit issuance of a new instruction, based on the accumulated energy stored in the capacitor.

9. A multi-core processor comprising:
a plurality of processing cores; and
a capacitor within each processing core, to supply stored accumulated energy to the processing core,
wherein the processing core is to:
store overall actual energy consumed by the processing core over time;
calculate an allowable energy that the electronic circuit is permitted to consume, as a sum of a predetermined value and an average of the overall actual energy consumed by the processing core over time;
calculate estimated energy that the processing core will consume to execute an issued instruction, based on actual energy consumed by the processing core when previously responding to the issued instruction;
determine the stored accumulated energy supplied by the capacitor when the processing core executes the issued instruction, based on the allowable energy that the electronic circuit is permitted to consume, the stored accumulated energy less than the allowable energy that the electronic circuit is permitted to consume; and
execute the issued instruction, the capacitor of the processing core to supply the stored accumulated energy to the processing core while the issued instruction is being executed.

* * * * *